US012741585B2

(12) United States Patent
Aguirre Contreras et al.

(10) Patent No.: US 12,741,585 B2
(45) Date of Patent: Sep. 22, 2026

(54) VEHICLE FASCIA COMPRISING ROTATING REFLECTORS

(71) Applicant: Zoox, Inc., Foster City, CA (US)

(72) Inventors: Sergio Angel Aguirre Contreras, Fremont, CA (US); Nahuel Elias Battaglia, Oakland, CA (US); Herman Francisco Delos Santos, Duncanville, TX (US); James Michael Eccleston, Foster City, CA (US); Ian Kennedy, Witney (GB); Andrew David Rudd, El Granada, CA (US); Christopher John Stoffel, San Carlos, CA (US); Lingxuan Zhu, Fremont, CA (US); Alexander Kraus, Las Vegas, NV (US)

(73) Assignee: Zoox, Inc., Foster City, CA (US)

( * ) Notice: Subject to any disclaimer, the term of this patent is extended or adjusted under 35 U.S.C. 154(b) by 310 days.

(21) Appl. No.: 18/240,946

(22) Filed: Aug. 31, 2023

(65) Prior Publication Data

US 2025/0074295 A1 Mar. 6, 2025

(51) Int. Cl.
*B60Q 1/34* (2006.01)
*B60Q 1/28* (2006.01)
*G02B 7/182* (2021.01)

(52) U.S. Cl.
CPC ............... *B60Q 1/346* (2013.01); *B60Q 1/28* (2013.01); *G02B 7/1821* (2013.01)

(58) Field of Classification Search
CPC ......... B60Q 1/346; B60Q 1/28; G02B 7/1821
See application file for complete search history.

(56) References Cited

U.S. PATENT DOCUMENTS

| | | | | |
|---|---|---|---|---|
| 5,806,221 | A * | 9/1998 | Vander Woude ..... | G09F 11/025 40/503 |
| 5,967,580 | A | 10/1999 | Rosheim | |
| 6,658,962 | B1 | 12/2003 | Rosheim | |
| 8,061,878 | B1 * | 11/2011 | Kuntz ...................... | B60Q 1/22 362/276 |
| 11,242,972 | B2 | 2/2022 | Hong et al. | |
| D973,244 | S | 12/2022 | Schmölz | |
| D973,927 | S | 12/2022 | Yang | |

(Continued)

FOREIGN PATENT DOCUMENTS

| | | | |
|---|---|---|---|
| JP | 2009078625 | A | 4/2009 |
| JP | 2015227156 | A | 12/2015 |
| KR | 20040006861 | A | 1/2004 |

OTHER PUBLICATIONS

WO 2015170591 A1 (Maruyama Masao) machine translation (Year: 2015).*

(Continued)

*Primary Examiner* — James A Dudek
(74) *Attorney, Agent, or Firm* — Lee & Hayes, P.C.

(57) ABSTRACT

A reflector unit may behave as a retroreflector to reflect light of a selected color. The reflector unit may comprise a plurality of reflector elements having a first side configured to reflect light of a first color and a second side configured to reflect light of a second color. In response to receiving a signal (e.g., indicating a bi-directional vehicle has changed a direction of travel), the reflector unit may cause the reflector elements to rotate and expose a different side of the reflector elements depending on the direction of travel.

20 Claims, 9 Drawing Sheets

(56) References Cited

U.S. PATENT DOCUMENTS

| | | | |
|---|---|---|---|
| D974,603 | S | 1/2023 | Loisch et al. |
| D990,730 | S | 6/2023 | DePeyster et al. |
| D991,506 | S | 7/2023 | Lin |
| D992,160 | S | 7/2023 | Lin |
| D999,413 | S | 9/2023 | Zhai |
| D1,010,174 | S | 1/2024 | Allmendinger |
| D1,014,834 | S | 2/2024 | Curic et al. |
| D1,037,512 | S | 7/2024 | George |
| D1,044,109 | S | 9/2024 | Thomas et al. |
| D1,053,399 | S | 12/2024 | Thomas et al. |
| D1,065,630 | S | 3/2025 | Lin |
| 2018/0081058 | A1 | 3/2018 | Kalscheur |
| 2021/0171064 | A1 | 6/2021 | Mimura et al. |
| 2021/0180772 | A1 | 6/2021 | Liu et al. |
| 2024/0270160 | A1 | 8/2024 | Almeida et al. |

OTHER PUBLICATIONS

CN 111867885 A to Sato machine translation (Year: 2020).*

Search Report and Written Opinion for International Application No. PCT/US2024/015050, dated May 30, 2024, 11 pages.

Amazon's Zoox robotaxis to drive faster, farther, at night in Las Vegas. Mar. 14, 2024. Reuters. https://www.reuters.com/technology/ a mazons-zoox-robotaxis-d rive-faster -farther -n ig ht-las-vegas-2024-03-14/, 12 pages.

Amazon self-driving robotaxi unit Zoox under U.S. investigation. May 13, 2024. Fortune. https://fortune.com/2024/05/13/amazon-self-driving-robotaxi-zoox-investigation-braked-suddenly-rear-ended-motorcyclists/, 23 pages.

CES 2025_ Self-driving cars were everywhere, plus other transportation tech trends. Jan. 12, 2025. Tech Crunch. https://techcrunch. com/2025/01 / 12/ces-2025-self-driving-cars-were-everywhere-plus-other -transportati on-tech-trends/, 21 pages.

Miric et al., Comparative Evaluation of Linear-Rotary Actuator Topologies for Highly Dynamic Applications, Power ElectronicSystems Laboratory, ETH Zurich, Zurich, Switzerland, IEEE (Year: 2017) 7 pages.

Office Action for U.S. Appl. No. 18/435,298, Dated Dec. 13, 2024, Alemeida, "A Vehicle Fascia Comprising Actuated Reflectors," 23 pages.

Case Law: *Ross-Hime Designs, Inc.* v *The United States*, 28 U.S.C. A§ 1498, 34 pages.

* cited by examiner

602

VEHICLE 602

PROCESSOR(S)
604

MEMORY
606

LIGHTING CONTROL LOGIC
608

PLANNING COMPONENT 610

DRIVE COMPONENT(S)
612

REFLECTOR UNIT CONTROLLER(S)
614

LIGHTS/REFLECTOR UNITS
616

VEHICLE CONTROLLER(S)
618

SENSORS(S)
620

- LOCATION
- INERTIAL
- LIDAR
- RADAR
- CAMERA
- MICROPHONE
- ENVIRONMENTAL

VEHICLE FASCIA COMPRISING ROTATING REFLECTORS

BACKGROUND

Vehicles can have multiple different types of lights and reflectors to illuminate the exterior of the vehicle and communicate with pedestrians or other vehicles in the environment. Such lights and reflectors allow a vehicle to be conspicuous and visible with respect to, for example, its presence, position and so on. The lights and reflectors on the front of the vehicle are often different than the lights and reflectors on the rear of the vehicle. However, current reflector designs may not function properly in non-traditional vehicles, such as those vehicles capable of traveling equally in any of a plurality of directions.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
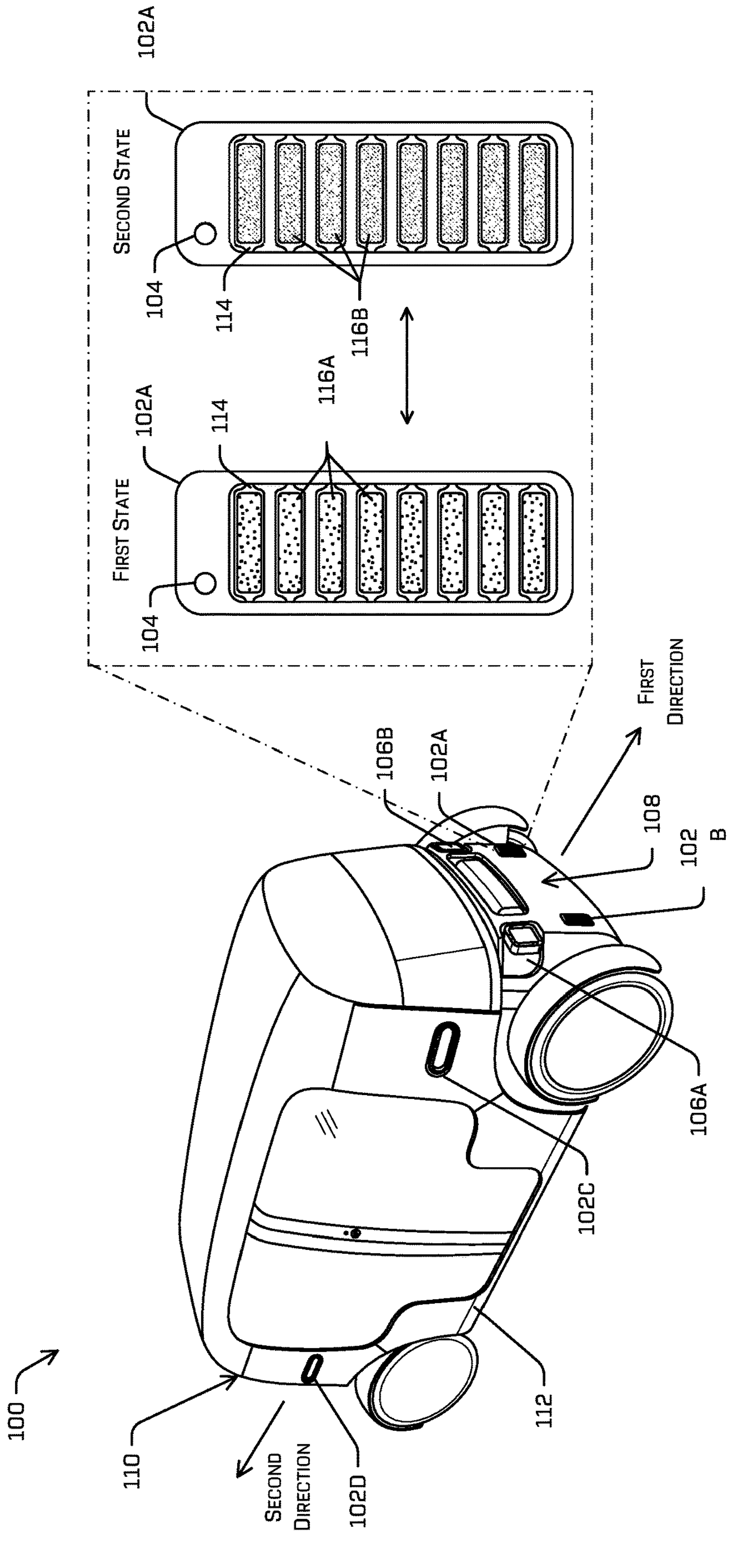
FIG. 1 depicts a perspective view of an example vehicle including various reflector units. The excerpted view illustrates example reflector elements changing from a first state to a second state, in accordance with an example of the present disclosure.

An example vehicle safety feature may comprise a white reflector on the front of the vehicle and a red reflector on the rear of the vehicle such that operators of other vehicles may quickly glean a travel orientation of the vehicle. For a bi-directional vehicle, such as, for example, one described in U.S. Pat. No. 11,242,972, filed Sep. 11, 2019, the entirety of which is incorporated by reference herein for all purposes, this may present a problem, since either end of the vehicle may be either the front (leading end) or rear (trailing end) of the vehicle depending on the configuration of the vehicle. Such bi-directional vehicles may be equipped with lighting that changes to indicate the directionality of the vehicle. For example, the autonomous vehicle may be equipped with a system to control the lights of the vehicle such that, in a first state, a first set of lights associated with one side of the vehicle are illuminated with a white hue to indicate a front of the vehicle and a second set of lights associated with another side of the vehicle are illuminated with a red hue to indicate a back of the vehicle. This may be inverted when the vehicle changes its operating direction by changing the lighting system to a second state illuminating the first set of lights with a red hue and the second set of lights with a white hue. Despite such lighting changes, additional safety features may be desired or required, such as a leading retroreflector and/or leading reflector of a first color and trailing reflector of a second color. The Federal Motor Vehicle Safety Standards currently requires a vehicle to have colored reflectors indicative of a leading or trailing end of the vehicle. For vehicles capable of operating symmetrically (e.g., being bi-directional), it is impossible to comply with such requirements by using traditional fixed reflectors.

This disclosure relates to reflector units of a vehicle and techniques for controlling the reflector units. Herein, the term "reflector" may, in some examples, refer to a retroreflector, which is an optical device or surface that reflects electromagnetic radiation (e.g., light) back toward its source with a minimum of scattering. Retroreflectors are designed such that a wavefront of radiation will be reflected straight back to the wavefront source for a relatively wide range of angles of incidence. Retroreflectors are often used on vehicles and for road signs. However, any material that is reflective to electromagnetic radiation (EMR), including EMR in the visible light spectrum, may be used. As used herein, the term "reflector" means a passive reflector, such as a retroreflector, that does not require power to reflect light. In some examples, other non-passive components, such as lights, displays, and the like may be coupled to, positioned adjacent to, used in connection with, or otherwise associated with one or more reflectors.

Individual reflector units may operate to reflect light of one or more selected colors. Here, a color of a reflector refers to the color of light that exits the reflector. In some examples, the color of a reflector may be imparted by a colored lens or filter of the reflector. For instance, a reflector unit may comprise, in some examples, a reflector element having multiple sides (e.g., two sides, three sides, four sides, etc.) where the individual sides include one or more reflectors configured to reflect, emit, display an image, light of a particular color, etc. into the environment. For example, a first side of a reflector element may have a reflector configured to emit light of a first color and a second side opposite the first side of the reflector element may have a reflector configured to emit light of a second color. That is, a reflector element may be configured to receiving incoming light (e.g., sunlight, headlights, etc.) and reflect back light of the first color or the second color depending on which side of the reflector element is exposed to the environment. The unexposed side of the reflector element(s) faces inward, toward an interior of the vehicle, and is prevented from reflecting or transmitting light into the environment. In this fashion, the reflector unit either reflects the incoming light as the first color or as the second color. In other words, the reflector unit may behave as a reflector having the first color or as a reflector having the second color, such a selection being based which side of the reflector element is exposed to the environment.

A reflector unit (or retroreflector system) disposed on a vehicle, may comprise one or more reflector elements (or retroreflector elements). A controller associated with the reflector unit may receive a signal indicating a change in a state of the vehicle (e.g., a change in a travel orientation or an indication to change an orientation of travel, a direction of travel, a distance traveled, and the like). As used herein, an orientation of travel may refer to one of two available orientations of travel for a bi-directional vehicle. The controller may cause an actuator (e.g., a motor, hydraulic or pneumatic cylinder, etc.) to activate a linkage coupled to the reflector element and can cause the reflector element to rotate. That is, the reflector element may be configured to change which side of the reflector element is exposed to the environment depending on an orientation of the vehicle (or most recent travel orientation of the vehicle in the situation where the vehicle is parked, is stationary, has malfunctioned, etc.).

In examples, the reflector element may include multiple sides or surfaces, and individual surfaces of the multiple sides/surfaces may include red, amber, or white/clear reflectors. However, any number of colors is contemplated and may be achieved based on the placement of the reflector unit about the vehicle (an interior, exterior, front, rear, roof, side, proximate a window, etc.) or a desired or intended function (e.g., to indicate a travel orientation or configuration of the vehicle, communicate with pedestrians or vehicles, provide an alert, indicate a fault or emergency, etc.). For example, reflector units on the front or rear of the vehicle may change between red and white colors while reflector units on the side of the vehicle may change between white and amber colors. In some examples, reflector units on the front and/or rear of the vehicle may transition between two states or colors and a reflector unit(s) positioned on a lateral side of the vehicle (e.g., proximate a passenger door) may transition between three or four states. In some examples, reflector elements may be configured to transition between two or more states based on a period of time (e.g., every 3 seconds, 5 seconds, 10 seconds, etc.) to indicate an emergency or fault associated with the vehicle in any combination (e.g., reflectors may individually change states from other reflectors in a same unit). Alternatively, a controller may cause the reflector elements to oscillate by sending a signal to the actuator to partially transition or rotate reflector elements (e.g., between about 10 to 45 degrees to the right and to the left, repeatedly). In some examples, causing the reflector elements to oscillate may be based in part on receiving an indication or signal that there is a fault associated with a one or more components of the vehicle.

In some examples, one or more sides of a reflector element may comprise an active display such as a liquid crystal display (LCD), light emitting diode (LED) display, organic light emitting diode (OLED) display, e-ink display, or other device (e.g., multi-segment display, quantum dot display, electroluminescent display, etc.) configured to change an image of its display. A display may be used to communicate with pedestrians or other vehicles (e.g., display a passenger's order number, provide an alert, indicate a state of the vehicle, etc.). Individual elements of a plurality of elements may display a portion of an image or message (e.g., a single letter or number) such that a complete image or message may be presented across the plurality of elements. In at least one example, one or more sides of a reflector element may comprise a light emitter, projector, steerable light, and the like.

FIG. 1 depicts a front, side view of an example vehicle 100 including various reflector units 102A, 102B, 102C, and 102D (collectively "reflector units"). This figure illustrates reflector unit 102A changing from a first state that reflects a first color or color pattern into the environment to a second state that reflects a second color or color pattern into the environment.

Vehicle 100, as an example, is depicted as being a passenger vehicle having four wheels/tires. Other types and configurations of vehicles are contemplated, such as, for example, vans, sport utility vehicles, crossover vehicles, trucks, buses, agricultural vehicles, trains, and construction vehicles. Vehicle 100 may be powered by one or more internal combustion engines, electric motors powered by one or more power supplies (e.g., batteries, hydrogen fuel cells, etc.), or any combination thereof. In addition, although vehicle 100 is illustrated to have four wheels/tires, the systems and methods described herein may be incorporated into vehicles having fewer or a greater number of wheels, tires, and/or tracks. Vehicle 100 in this example is a bidirectional vehicle having four-wheel steering and may operate generally with equal performance characteristics in all directions, for example, such that a first end 108 of vehicle 100 is the front end of the vehicle when traveling in a first direction, and such that first end 108 becomes the rear end of the vehicle when traveling in the opposite, second direction, as illustrated in FIG. 1. Similarly, a second end 110 of the vehicle is the front end of the vehicle when traveling in the second direction, and first end 108 becomes the rear end of the vehicle when traveling in the second direction. These example characteristics may facilitate greater maneuverability, for example, in small spaces or crowded environments, such as parking lots and urban areas. Thus, because of a bi-directionality of vehicle 100, each of the reflector units may sometimes operate as a red reflector or indicator (e.g., red color associated with the rear of a vehicle) while at other times operating as a white reflector or indicator (e.g., white color associated with the front of a vehicle).

In some examples, vehicle 100 may be an autonomous vehicle configured to operate according to a Level 5 classification issued in 2016 by the U.S. National Highway Traffic Safety Administration, which describes a vehicle capable of performing all safety-critical functions for an entire trip, with the driver (or occupant) not being expected to control the vehicle at any time. In that case, since the vehicle may be configured to control all functions from start to stop, including all lighting functions, it may be unoccupied. This is merely an example, however, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. Of course, such techniques need not be implemented in a vehicle at all and may be implemented in various systems and apparatuses.

A first reflector unit may be placed on a first end of a bi-directional vehicle and a second reflector unit may be placed on the second end (i.e., opposite end) of the bi-directional vehicle. If the vehicle is travelling so that the first end of the vehicle is leading the second end, then the first reflector unit may function to behave as a white reflector for the front of a vehicle. Also, the second reflector unit may function to behave as a red reflector for the rear of a vehicle. On the other hand, if the vehicle is travelling so that the second end of the vehicle is leading the first end, then the first reflector unit may function to behave as a red reflector for the rear of a vehicle, and the second reflector unit may function to behave as a white reflector for the front of the vehicle.

One or more reflector unit(s) 102 may be disposed about vehicle 100. In some examples, one or more reflector unit(s) may be incorporated into a headlamp, turn signal, other light fixture on the vehicle, bumper, etc. A first reflector unit may be located in a first part of the vehicle and a second reflector unit may be located in a second part of the vehicle. For example, two reflector units (102A and 102B) may be placed on a first end 108 of a bi-directional vehicle and two other reflector units (not visible in FIG. 1) may be placed on the second end 110 of the bi-directional vehicle. Additional reflector units, such as reflector unit 102C and reflector unit 102D may be disposed on a side of the vehicle.

Though only four reflector units are depicted in FIG. 1, an additional four reflector units are present on the second end 110 and opposite side of the vehicle which are not visible in FIG. 1. Further, any greater or lesser number of reflector units may be utilized in other examples. A reflector unit may be coupled to a component of vehicle 100 including one or more fascia, quarter panels, wheel(s), doors, roof, body, bumper, underside, interior, exterior, etc. depending on a desired functionality. For example, a reflector unit may be duplicated in both quarter panels of a same side of vehicle 100 and/or may be duplicated on opposite sides of the vehicle, such as in the bi-directional vehicle example described above.

Reflector units disposed on a vehicle may differ depending on the location of the reflector unit. For example, reflector unit 102A and reflector unit 102B which are disposed on an end of vehicle 100 are configured to switch between a first color (e.g., red) and a second color (e.g., white/clear) while reflector unit 102C and reflector unit 102D are disposed on a side 112 of vehicle 100 proximate the vehicle door and may be configured to switch between a first color (e.g., red or white) and a third color (e.g., amber) that may be different than the second color. In some examples, reflector unit 102A and reflector unit 102B may comprise two sides and reflector unit 102C and reflector unit 102D may comprise three or four sides due to being disposed on a non-leading or trailing side of the vehicle.

Reflector units may comprise one or more reflector element(s) 114 configured to passively reflect light and one or more side marker light(s) 104 configured to actively emit light into the environment. In some examples (not shown), side marker light(s) 104 may surround a perimeter of the reflector unit 102 (e.g., form a ring shape, oval shape, rectangular shape, etc.), while in the example illustrated the side marker light(s) 104 comprise a circular dot or lamp disposed on a surface or bezel of the reflector unit 102 proximate to the reflector element(s) 114. In some examples, depending on applicable rules, regulations, laws, a side marker light may be included on a reflector unit disposed on a leading and/or trailing end of a vehicle and not on a reflector unit disposed on a side of the vehicle. A reflector unit 102 may provide a functionality of a retroreflector having a particular color. Here, color of a retroreflector refers to the color of light that exits the retroreflector. For example, a retroreflector may comprise a colored material (e.g., plastic, glass, etc.) that reflects a portion of the spectrum of incoming white light, wherein the portion corresponds to the color of the reflector. In some examples, one or more sides of the reflector element 114 may comprise reflectors that do not introduce color to incoming white light, but instead (or additionally), one or more color filters may be disposed on a front of a side of a reflector unit to introduce a color to the reflected incoming white light. In some examples, one reflector element may reflect a red, white, or amber color, although any color or color combination may be contemplated. In the case where the color is white (or clear), a side of the reflector element 114 may comprise a clear material that does not introduce color, so that incoming white light remains white upon reflection by the retroreflector.

A first side of a reflector element 114 may be configured to reflect light of a first color 116A (e.g., red, amber, white, etc.) and the second side may be configured to reflect light of a second color 116B different than the first color. As described above, this allows the reflector unit to take on multiple states and communicate to other vehicles a travel orientation of the vehicle. Retroreflector units disposed on opposite ends or sides of the vehicle may be maintained in different or opposite states. For example, first retroreflector unit(s) disposed on a first end 108 of the vehicle 100 (e.g., a leading end) may be associated with a first state and reflecting a first color (e.g., white or amber) and second retroreflector unit(s) associated with a second end 110 of the vehicle may be associated with a second state and reflecting a second color (e.g., red). In at least one example, it is contemplated that the states of the reflector unit(s) 102 on opposite sides of the vehicle 100 may be the same. Of course, in any example enumerated herein, the colors or combination of colors may vary depending on applicable rules, regulations, laws, and other considerations.

A controller (e.g., controller 512 introduced below) may be configured to receive signals from various systems or components. For example, a controller may receive an electrical signal from a planner component of the vehicle indicating a change in a state of a vehicle (e.g., a change in an orientation or configuration related to a direction of travel or an indication that the vehicle is about to change an orientation of travel) and may cause the reflector unit(s) to transition from a first state to a second state. In some examples, the reflector elements may transition between a first state to a second state based on a period of time (e.g., 3 seconds, 5 seconds, 10 seconds, etc.) in order to indicate a fault or emergency. In at least one example, a controller may cause the reflector elements to oscillate by sending a signal to the actuator to partially transition or rotate reflector elements (e.g., between about 10 to 45 degrees to the right and to the left, repeatedly). In some examples, causing the reflector elements to oscillate may be based in part on receiving an indication or signal that there is a fault associated with a one or more components of the vehicle. A controller may also receive signal(s) from other components or systems including a localizer system, sensor systems, perception system, one or more safety systems, and other systems of a vehicle. In some examples, the controller may be configured to receive signals from a source external to the vehicle such as from an autonomous vehicle service platform, fleet manager, remote computing device (e.g., teleoperator computing device). In some examples, different reflector systems may be configured to communicate or receive signals from different systems or components associated with the vehicle.

When the vehicle is turned off or parked, a most-recent direction of motion of the vehicle may dictate which side of a reflector element is facing the environment. This ensures that the retroreflector units are always capable of reflecting light passively, particularly during the evenings when visibility may be diminished. In some examples, reflector unit 102 may be a bi-stable device and generally only consume power when changing from one state to another. Once power is removed, the state of the bi-stable reflector unit can remain for relatively long period (e.g., indefinitely). For example, if reflector unit 102 is bi-stable, then reflector unit 102 need not consume power to maintain the state (e.g., position reflector element(s) such that a first side is exposed and not the other side(s)). In such an example, despite loss of power, a bidirectional vehicle may continue to comply with functional safety requirements.

Vehicle 100 is illustrated to also include dual function light units 106A and 106B that may function as headlights when traveling in the first direction and may switch to function as taillights when traveling in the second direction. Light units 106A and 106B may be located at locations of vehicle 100 other than what is indicated in FIG. 1. In some examples, a reflector unit may be located on vehicle 100 above, below, and/or beside the light units 106A and 106B of the vehicle 100.

Figure 2:
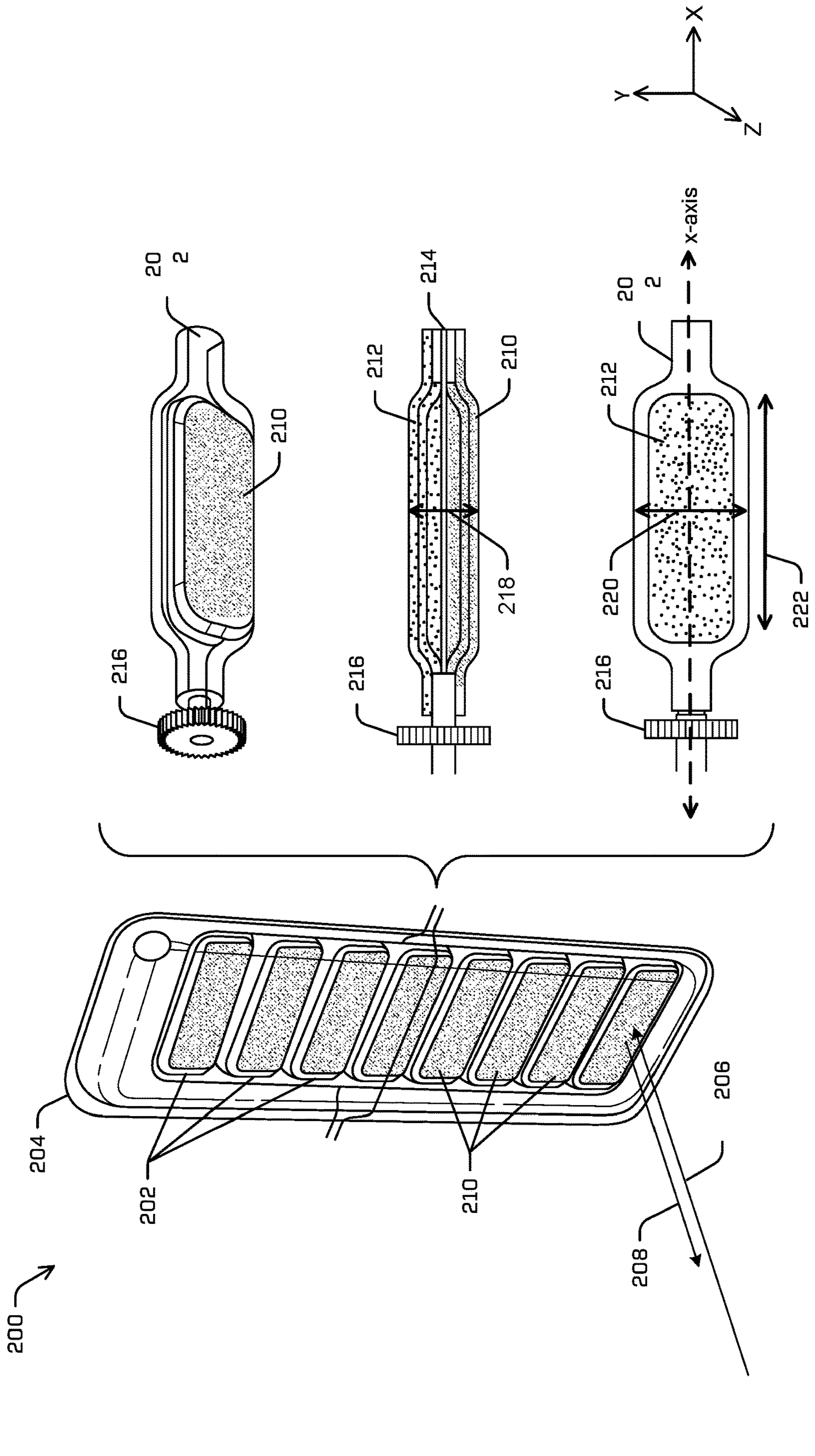
FIG. 2 depicts an enlarged detail view of an example reflector unit including a reflector element transitioning from a first state to a second state.

FIG. 2 depicts an enlarged detail view of an example reflector unit 200 including one or more reflector elements 202 transitioning from a first state to a second state. Example reflector unit 200 is one example that may be used for the reflector units 102A, 102B, 102C, 102D illustrated in FIG. 1. The reflector unit 200 may comprise one or more individual reflector elements 202. The reflector unit 200 may be covered by a protective, transparent or translucent cover 204. Though eight reflector elements 202 are depicted in FIG. 2, any number of reflector elements 202 may be included in a reflector unit (e.g., 1, 2, 3, 4, 10, 15, 20, . . . N reflector elements etc.). The reflector elements may be positioned and oriented relative each other such that multiple reflector elements appear as a uniform reflector to an observer.

Cover 204 may be configured to be coupled to an exterior of a vehicle and/or a housing (not shown) associated with reflector unit 200. Cover 204 may be used as a protective cover and prevent rain, dirt, debris, etc. from entering the reflector unit 200 and damaging internal components, such as linkages 216 (e.g., pinions). In examples, cover 204 may be formed from a transparent, translucent, and/or weather resistant material, including, for example, plastic, polycarbonate, plastic polymer, acrylic (PMMA), polybutylene terephthalate (PTB), polyethylene terephthalate (PET), acrylonitrile styrene acrylate (ASA), glass, or the like. The cover 204 may have tapered edges such that a view of the reflector elements is not obstructed. In some examples, cover 204 may be treated with a hydrophobic or otherwise weather resistant coating. Depending on applicable rules, regulations, and/or laws, a cover, lens, or housing around the reflector elements may be used to indicate to an observer that multiple reflector elements behave as one holistic reflector or unit.

Reflector elements 202 may comprise of various sizes, shapes, widths, and/or lengths. In examples, reflector elements 202 may have a generally rectangular, square, spherical, pill shape (e.g., elongated with rounded corners), etc. In some examples, reflector elements 202 may be uniform in size, width 220, length 222, and/or thickness 218 (or depth) similar to what is depicted in FIG. 2. In at least one example, the reflector elements may vary in length but may have a uniform width. Reflector elements having a uniform width 220 enable the reflector elements 202 to rotate in parallel along an axis (e.g., x-axis shown in FIG. 2) while preventing the reflector elements from contacting or damaging adjacent reflector elements while transitions between various states (e.g., during rotation). In some examples, the thickness 218 or depth of the reflector elements 202 within the reflector unit may vary. In some examples, reflector element(s) toward a center of a reflector unit may have a greater length (e.g., 10 cm) while the reflector elements toward the ends of the reflector unit may taper to a shorter length as compared to the center reflector element (e.g., 8 cm, 6 cm, etc.), such that a diamond shape is formed, although many different shapes and combinations are possible.

Reflector elements 202 may be spaced apart from one another in a uniform or non-uniform manner. In the example shown in FIG. 2, the reflector elements are aligned in a uniform manner relative to each another. In at least one example, the reflector elements may be staggered relative to each other. For example, the reflector elements may have an equal width and length but align in a non-parallel manner relative to each other (e.g., form a wavy or curved design). The reflector elements may be coupled to one or more linkages (e.g., racks, pinions, gears, links, etc.). For instance, the reflector elements 202 are rotatable about parallel axes (parallel to the x-axis). A pinion gear may be fixedly coupled to one end of each reflector element 202. In this way, multiple reflector elements 202 can be actuated by a single rack (e.g., rack 306 as described in relation to FIG. 3A below) which engages with the pinion gears of the multiple reflector elements 202 and allows for the reflector elements 202 to rate at the same time in concert.

FIG. 2 depicts reflector elements 202 having two sides. However, a greater number of sides may be contemplated (e.g., three sides, four sides, etc.). It is to be understood that a side of a reflector element as described in this disclosure may include a planar and/or nonplanar surface (e.g., a side of a cylindrical reflector element represents a portion of the cylindrical element that is exposed to an exterior environment). Each of the sides of a reflector element 202 may be associated with a same or different color, combination of colors, patterns, type of surface (e.g., a reflective surface, non-reflective surface, blank surface, active display), material (e.g., reflective or non-reflective material) etc. For example, a first side 210 of the reflector element may have a first color and a second side 212 opposite the first side may have a second color different than the first color, a blank or non-reflective surface, an active surface comprising a display, etc. This allows incoming light 206 to reach and reflect 208 from one of the two sides, depending on which side is exposed to the environment, and not the other side.

The reflector element(s) 202 may transition or switch between two states based on an orientation or configuration of the vehicle and effectively communicate to other vehicles which end of the vehicle is the leading end and which is the trailing end. That is, the reflector unit either reflects 208 the incoming light as the first color or as the second color based on which side of the reflector unit is exposed to the environment. In some examples, the reflector elements may transition between two or more states based on other signals received from various components on the vehicle.

In some examples, one or more sides of a reflector element may be a "blank" or a non-reflective flat surface that is not intended to behave as reflector. For example, a blank side of a reflector element may comprise of a material that is the same or similar to the vehicle, such as a polymer, carbon fiber, metal, composite, or the like, but may, in some examples, be a different material than the vehicle (e.g., plastic, polycarbonate, acrylic, and the like).

A surface area of a side (e.g., first side 210 and/or second side 212) of an individual reflector element may range from about 10 $cm^2$ to about 40 $cm^2$ In at least one example, a side of an individual retroreflector may have a surface area of between about 20 $cm^2$ to about 30 $cm^2$, and in some examples a surface area of about 25 $cm^2$. In some examples, reflector elements of a reflector unit may have different surface areas due to varying lengths of the reflector elements. In some examples, the surface area of individual reflector elements or a total surface area of multiple reflector elements may depend on a minimum and/or a maximum reflection surface area as required by applicable rules, regulations, and/or laws. In at least one example, an outer surface of the cover 204 or an outer lens may be used to determine a total reflection surface area of the reflective elements.

A first side 210 and second side 212 of the reflector element may be separated by a barrier 214. The barrier 214 may be configured to prevent or block the photometric elements (or color) from a first side 210 from bleeding through to a second side 212 and changing the color that is reflected into the environment. That is, the barrier behaves as a light-blocking element that prevents light from reaching an adjacent or opposite (i.e., unexposed) side of a reflector element. In some examples, the barrier may be planar, concave, convex, etc. The curvature of a convex barrier may change the dynamics of how light reflects off of the retroflector (i.e., by changing the angle of incidence and/or angle of refraction).

In some examples, individual reflector element(s) may be associated with a linkage 216. Linkage 216 may comprise a mechanical linkage such as a pinion, hydraulic piston, pin, link, arm, or the like. For example, the linkage 216 may be a pinion configured to rotate about an x-axis (or an axis parallel to the x-axis) as shown in FIG. 2 and in response to movement of a track or rack, as discussed in further detail below in regard to FIG. 3A.

Figure 3A:
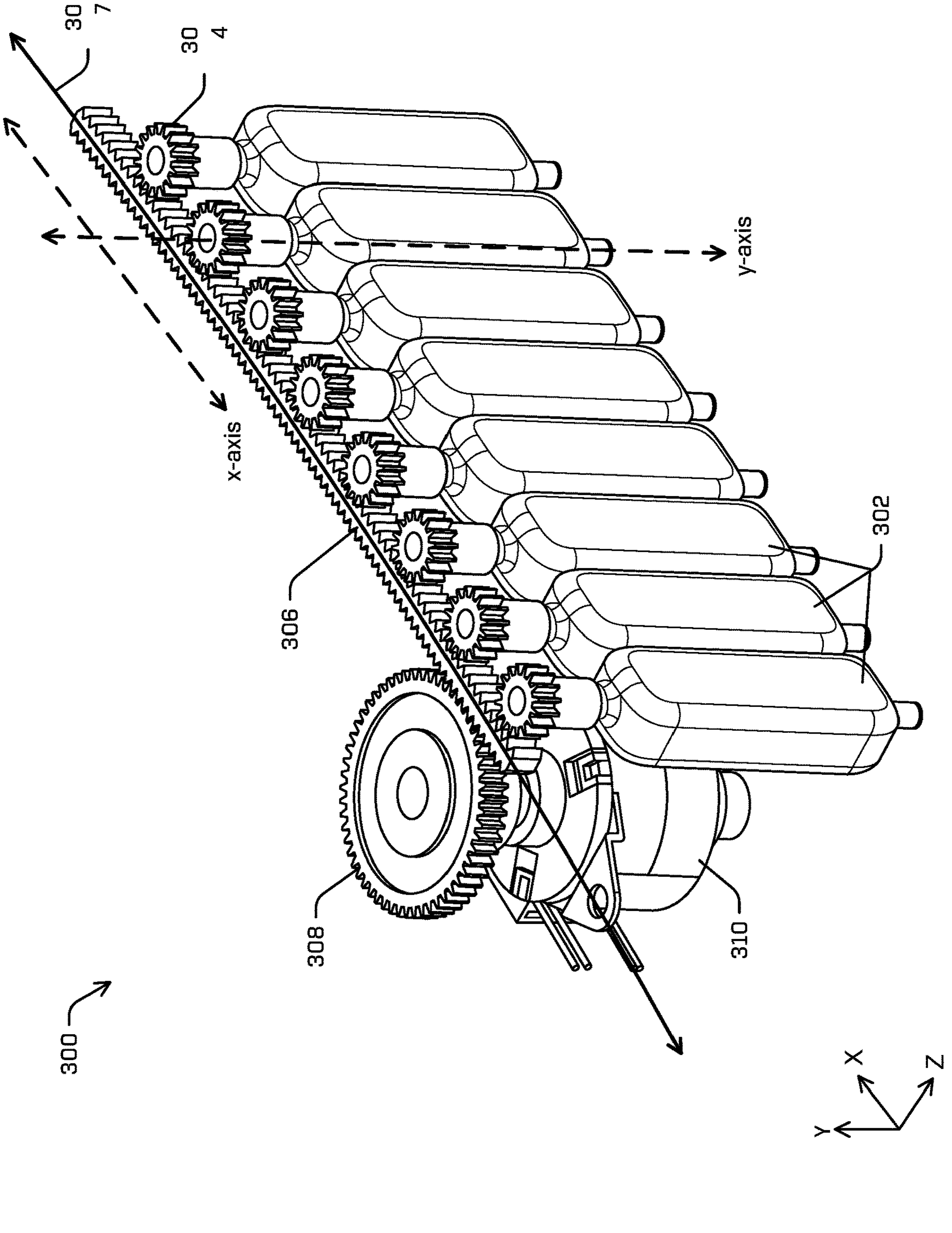
FIG. 3A depicts a perspective view of internal components of an example reflector unit.

FIG. 3A depicts a perspective view of an example reflector unit 300. A reflector unit 300 (or reflector system) may comprise one or more individual reflector elements 302, one or more linkage(s) 304 in contact with a rack 306, and/or a gear coupled to an actuator 310 in communication with a controller (not shown).

In examples, reflector elements 302 may correspond to reflector elements 202 described in regard to FIG. 2. Individual reflector elements 302 may be couped to individual linkages 304. As described above, linkage 304 may be a pinion, hydraulic piston, pin, arm, or the like. In the particular example shown in FIG. 3A, the linkage 304 may be a pinion configured to rotate about an axis (e.g., x-axis) in a first direction and a second direction in response to movement of a track or rack coupled to the linkages. In other examples, the linkage 304 may include a cam and/or rotary mechanical linkage or a belt driven system. In some examples, the linkage(s) 304 may extend from the reflector elements 302 at equal lengths so that the reflector elements 302 are aligned parallel to one another. In at least one example, the linkage(s) 304 may vary in length such that the reflector elements are not aligned relative to one another and form a curved, s-shaped, or wavy design, while still maintaining contact with rack 306 and move in unison.

Rack 306 may have a planar or curved profile. For example, FIG. 3A depicts a rack 306 having a non-planar profile (e.g., an arc 307). In examples, the rack 306 may have a non-planar profile that follows a curve of a body or fascia of a vehicle. For example, a reflector unit 300 may be disposed on a portion of a vehicle that is non-planar and the curved profile of the rack 306 may correspond to or follow the curve of the body or fascia of the vehicle. A curved rack may cause the one or more linkage(s) 304 (e.g., pinions) to rotate the reflector elements along a barrel curve. In examples, the curved rack may cause the plurality of reflector elements to be disposed off-plane (e.g., at slightly different angles) relative to each other.

In some examples, the rack 306 and linkages 304 are in contact with each other such that, upon activation, the reflector elements 302 to rotate in unison (i.e., rotate together at a same or similar rate) while being able to sit off plane from each other due to the curved profile of the rack 306. In at least one example, the reflector elements may transition or rotate sequentially and not in unison (e.g., where individual reflector elements are independently controlled by individual actuators and/or controllers).

Rack 306 may be in contact with a gear 308 coupled to an actuator 310. In examples, the actuator 310 may be any motor suitable for providing force to the rack 306, such as a servomotor, electric motor (brushed or brushless), stepper motor, hydraulic actuator, electro-hydraulic system, linear actuator, pneumatic actuator, or the like. In FIG. 3A, the actuator is illustrated as an electric motor. Operation or activation of actuator 310 causes the gear 308 to rotate or spin. Rotating (or activating) gear 308 causes rack 306 to move in a first direction or a second direction. That is, force transferred from actuator 310 to the linkage(s) 304 may cause the reflector elements 302 to rotate in a first direction or a second direction about an axis (e.g., y-axis as shown in FIG. 3A). Rotating the reflector elements 302 in response to activation of the actuator 310 causes the reflector elements to transition from a first state (e.g., a first color) to a second state (e.g., a second color). In at least one example, individual reflector elements may be controlled via individual actuators (e.g., individual motors). This would enable the reflector elements to be controlled independently of one another. For example, separate actuators and/or controllers may enable a more customizable control of individual reflector elements, including various states of the reflector elements (e.g., transitioning a portion of a plurality of reflector elements while maintaining the state of the other reflector elements), a speed of transition (e.g., rotating reflector elements at various rates), sequential or non-sequential transitioning, and/or a direction of transition (e.g., causing a right half of the reflector elements to rotate toward the left and causing a left half of the reflector elements to rotate toward the right, although any combination is contemplated), and the like.

The actuator 310 may be disposed within an interior of the vehicle (e.g., behind the fascia and/or within a housing (best shown in FIG. 3C) of the reflector unit 300. In examples, the one or more linkages 304 may also be disposed on the interior side of the fascia or housing, although, in some examples, at least part of the one or more linkages 304 may be disposed on the exterior side of the fascia or housing. In the latter example, an exposed portion of the linkage may be concealed with a cover, shroud, trim, and/or a seal.

Figure 3C:
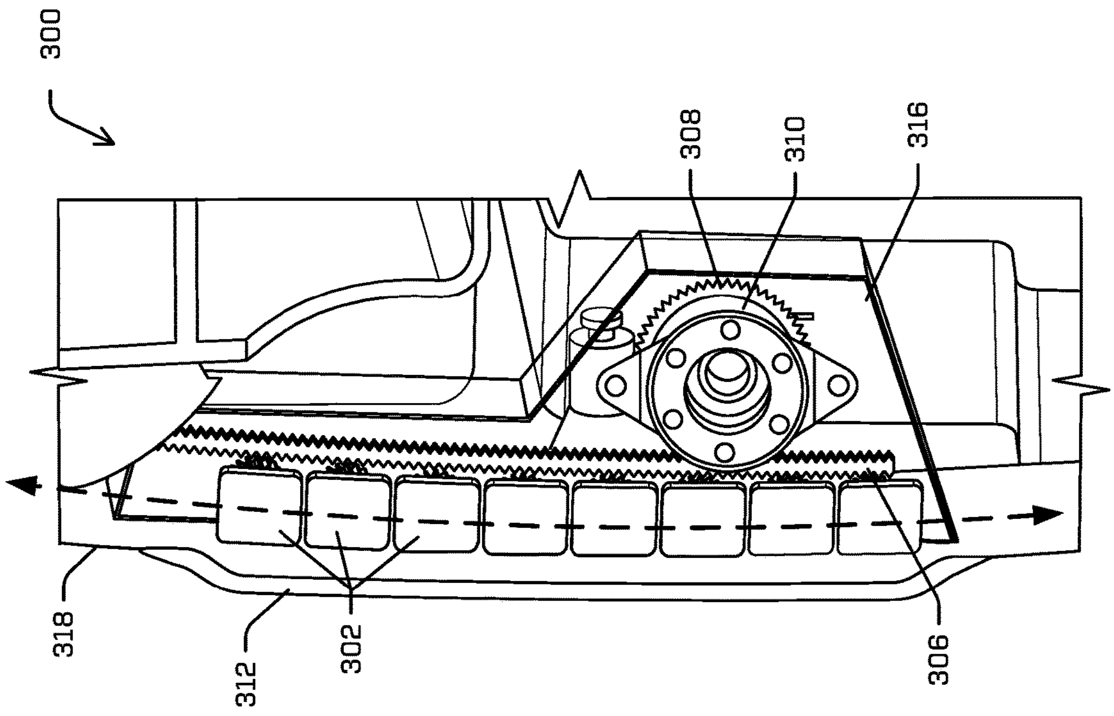
FIG. 3C depicts a cross-sectional view of the example reflector unit coupled to the vehicle and illustrating a curved profile of the reflector unit.
Figure 3B:
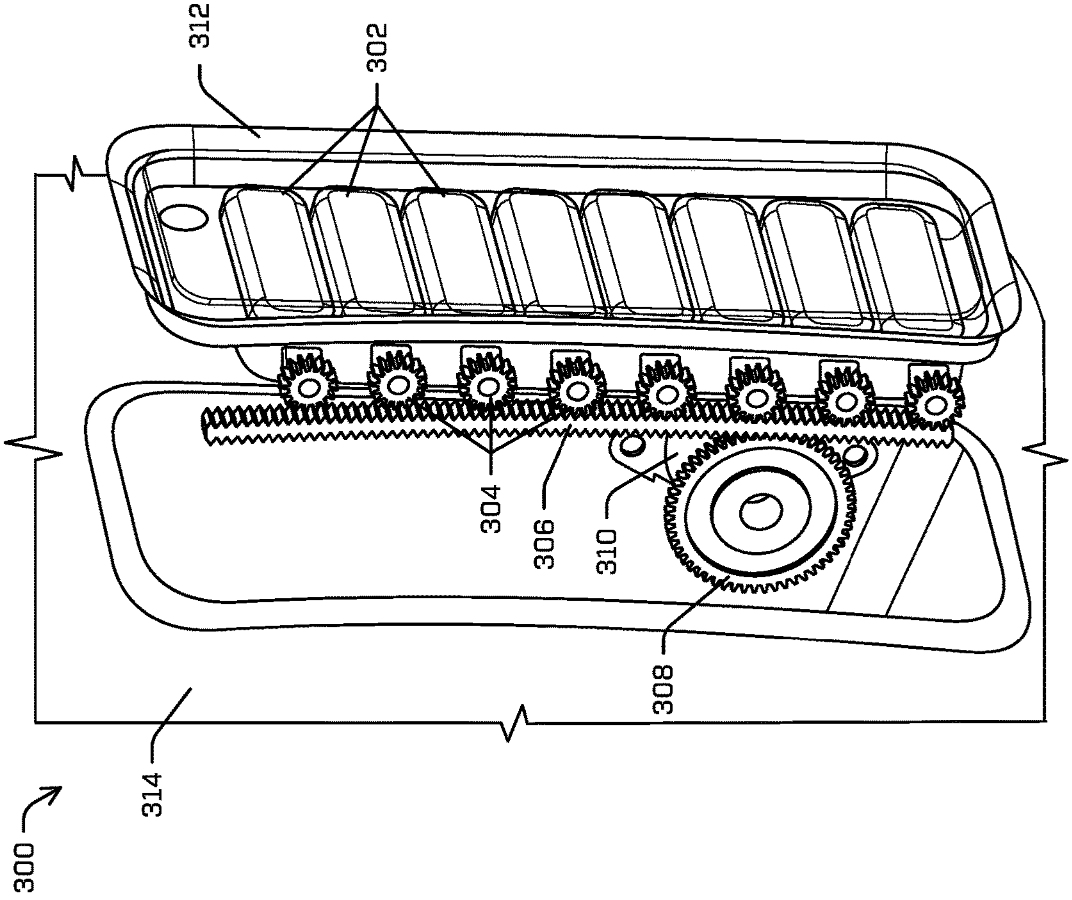
FIG. 3B depicts a perspective view of the example reflector unit in relation to a vehicle fascia.

FIG. 3B depicts a perspective view of the example reflector unit 300 coupled to a fascia 314 of a vehicle (e.g., vehicle 100). FIG. 3C depicts a cross-sectional view of the example reflector unit 300 coupled to the fascia 314 of the vehicle. The reflector unit 300 may include a cover 312 or lens. The cover 312 may be transparent or translucent in order to allow light to reach and reflect from the retroreflector elements. In some examples, a portion of cover 312 may be coupled to or abut a body of the vehicle.

Reflector unit 300 may be disposed within housing 316. Housing 316 may surround the one or more individual reflector elements 302, one or more linkage(s) 304, rack 306, gear 308 and/or actuator 310. Housing 316 may be sealed so as to be substantially water resistant. As described above, housing 316 may be composed of a same or similar material to a fascia of the vehicle, such as a polymer, carbon fiber, metal, composite, or the like, but may, in some examples, be a different material than a fascia of the vehicle. In examples, housing 316 may be settled or disposed on the interior side of the fascia (i.e., behind the fascia) or may protrude through the fascia with a rim or bezel of the housing and the lens or cover 312 of the reflector unit 300 disposed on an exterior of the fascia and other portions of the reflector unit disposed behind or within the fascia of the vehicle.

One or more portions of the reflector unit (e.g., rack 306) may be non-planar and/or conform to a curved portion of a vehicle. For example, curved portion 318 may be disposed above, below, beside, or on a headlight, turn signal, on a bumper, proximate a corner of a vehicle, on or proximate a tire or wheel, on or proximate a passenger door, proximate a window of a vehicle, or any other portion of the vehicle. In some examples, the reflector unit may be built into the main body or housing of a headlight.

Figure 4A:
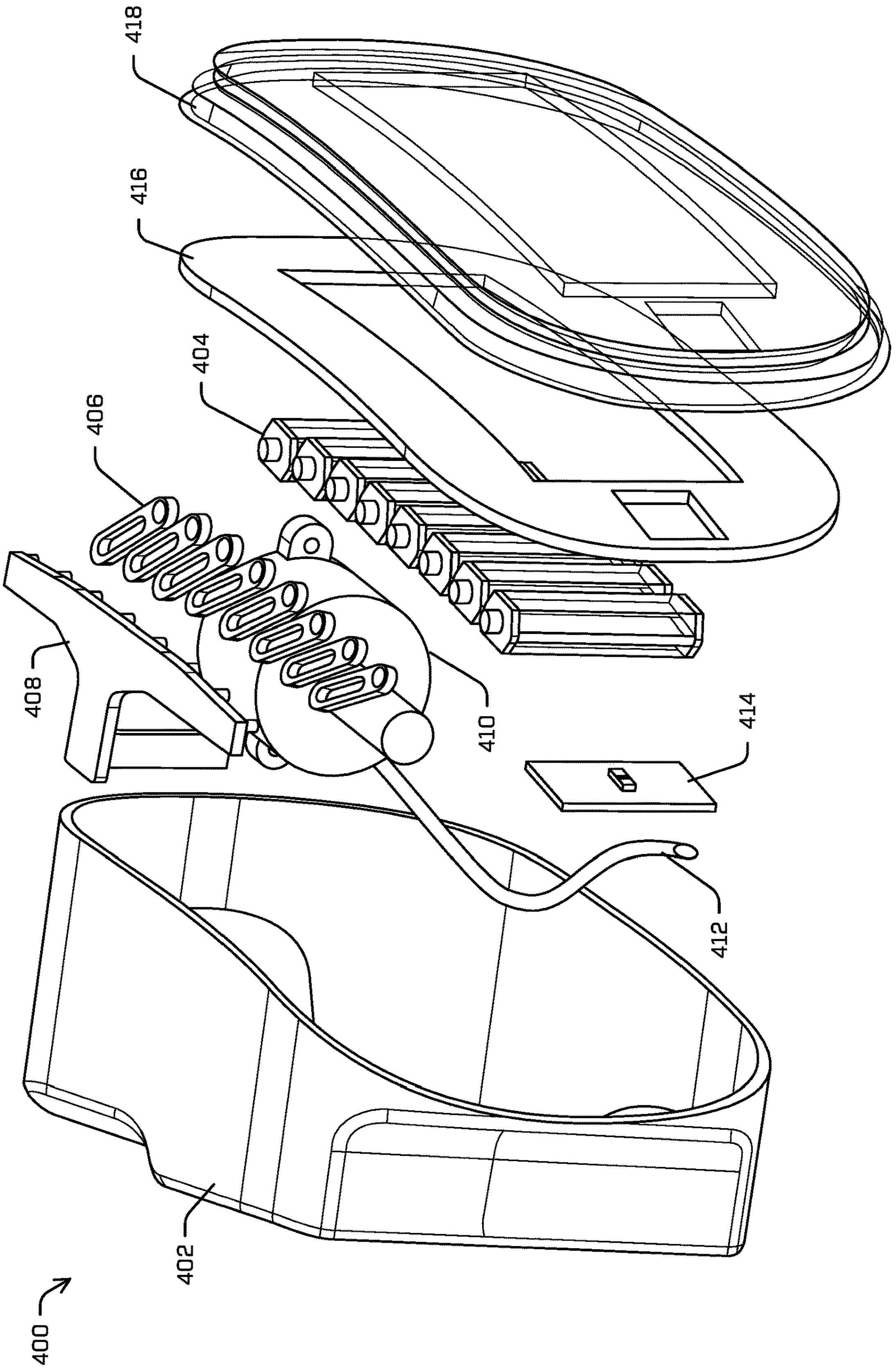
FIG. 4A depicts a perspective view of another example reflector unit.

FIG. 4A depicts a perspective view of internal components of another example reflector unit 400. Reflector unit 400 may comprise one or more of a housing 402, a plurality of reflector elements 404, a plurality of linkages 406, a carrier 408, an actuator 410, a jumper harness 412, a side marker light 414, an inner enclosure 416, and/or an outer lens 418.

Housing 402 may be comprised of a same or similar material to a component (e.g., fascia) of the vehicle, such as a polymer, carbon fiber, metal, composite, or the like, but may, in some examples, be a different material than a fascia of the vehicle. In examples, the housing 402 may be settled or disposed on the interior side of a component of the vehicle (i.e., behind the fascia). In examples, the housing 402 may be attachable to the body of a vehicle. In examples, the plurality of reflector elements 404 may be similar to the one or more plurality of reflector elements as described in relation to FIG. 1-3C. Reflector elements 404 may be repositioned from a first position to a second position by an actuator (e.g., motor) and linkages (e.g., pivot arms) such that different sides of the reflector elements are exposed to the environment. In a first position, a first side of the reflector element may be exposed to the environment and in the second position, a second side of the reflector element may be exposed to the environment. Though FIG. 4A depicts eight reflector elements 404 having two sides, any number of reflector elements may be used (e.g., 1, 2, 3, 4, 10, 15, 20, . . . N reflector elements etc.) and may have more sides (e.g., three sides, four sides, etc.).

Individual reflector elements 404 may be coupled to individual linkages 406, or reflex pivot arms, that are configured to move in a first direction and a second direction (i.e., from side to side). The plurality of linkages 406 or pivot arms are coupled to carrier 408. Carrier 408 may be an actuator carrier arm configured to transfer force generated by the actuator 410 onto the plurality of linkages 406. Linkages 406 may then pivot or move and cause the reflector elements to change from a first position to a second position, and as a result, transition from a first state to a second state (e.g., by pivoting 180 degrees). In an example where the reflector elements have three sides (i.e., three states), the reflector elements may rotate 120 degrees. In an example where the reflector elements have four sides (i.e., four states), the reflector elements may rotate 90 degrees.

Actuator 410 may be used to initiate and/or control motion of the plurality of reflector elements 404. Actuator 410 may be, for example, any motor suitable for providing force to the carrier 408, such as a servomotor, electric motor (brushed or brushless), stepper motor, hydraulic actuator, electro-hydraulic system, linear actuator, pneumatic actuator, or the like. Operation or activation of the actuator 410 causes the carrier 408 to move linkages 406 and, as a result, cause the reflector elements 404 to change from a first state (e.g., a first color) to a second state (e.g., a second color). In at least some examples, actuator 410 may be controlled based at least in part on a signal indicative of a change in state of vehicle, such as a change in travel orientation. In at least some examples, such a reflector unit may allow for a vehicle employing these techniques to remain in compliance with lighting requirements despite losing control.

Jumper harness 412 may be used to connect actuator 410 to a wiring harness of an electrical circuit (not shown) of the vehicle. Jumper harness 412 may include multiple electrical conductors and connectors. In some examples, wires, cables, a flexible printed circuit board, or other electrical connectors, may be used in additional to or in place of the jumper harness.

Side marker light 414 may be disposed within or proximate the housing 402. In some examples, a side marker light may be additionally or alternatively be disposed on other locations of the vehicle (e.g., the vehicle's bumper, fender, rear quarter panel, etc.). As discussed above, side marker light(s) may be configured to actively emit light into the environment. In some examples, the color of light the side marker is configured to emit may depend on the location of the side marker on the vehicle or on an orientation of the vehicle (e.g., a side marker disposed on a side of the vehicle may emit an amber color). In some examples (not shown), side marker light(s) 414 may surround a perimeter of the reflector unit 400 (e.g., form a ring shape, oval shape, rectangular shape, etc.), while in the example illustrated the side marker light(s) 414 comprise a rectangular dot or lamp disposed on a surface the reflector unit 400 proximate to the reflector element(s) 404. Side markers may be a light (e.g., an LED) designed to increase the visibility of a vehicle, especially at night or during low-light conditions. In some examples, multiple side markers may be used to indicate a length or width of a vehicle. Though only one side marker is shown in FIG. 4A, any number of side markers may be used. In some examples, multiple side markers may be used around a perimeter or contour of the housing 402, reflector elements 404, outer lens 418, and/or inner enclosure 416 and form a ring shape or other design.

In some examples, inner enclosure 416 may be opaque and cover or conceal various non-reflective components within housing 402. For example, an opaque inner enclosure may be used to cover, in whole in part, linkages 406, carrier 408, actuator 410, jumper harness 412, and/or other components within housing 402. In examples, inner enclosure 416 may be coupled (e.g., via an adhesive) to outer lens 418.

In some examples, outer lens 418 may be a transparent or translucent cover and allow light to reflect from reflector elements 404. In some examples, a portion of outer lens 418 may be coupled to a portion of the vehicle. In some examples, a seal (not shown) may be disposed between various components in the retroreflector unit (e.g., between outer lens 418 and housing 402) to protect interior components of the reflector unit 400 from water, dust, debris, etc. The seal may be made from a pliable material such as rubber, silicone, polymer, or any combination thereof. In some examples, the seal may be treated with a hydrophobic or otherwise weather resistant coating.

Figure 4B:
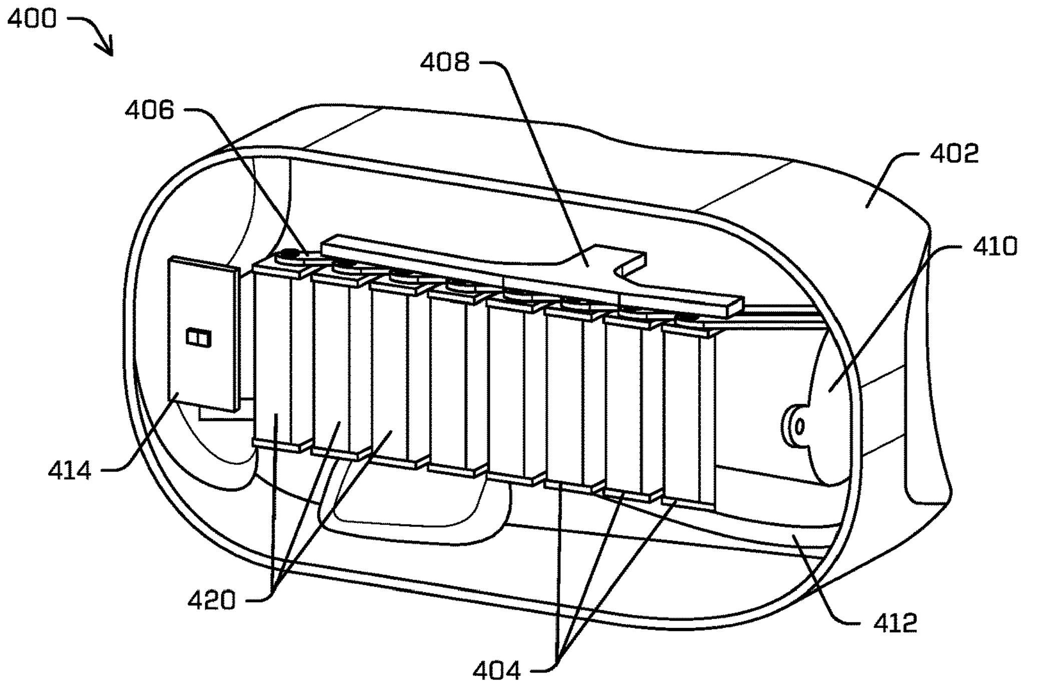
FIG. 4B depicts a front view of the example reflector unit of FIG. 4A.

FIG. 4B depicts a front view of assembled reflector unit 400 without an inner enclosure or transparent outer lens. The example illustrated in FIG. 4B and FIG. 4C demonstrate how reflector unit 400 may have multiple sides or surfaces and individual surfaces of the multiple sides/surfaces may include different color reflectors. For example, a first side 420 of reflector elements 404 may have a first color (e.g., white or clear) and a second side 422 opposite the first side 420 may have a second color different than the first color (e.g., red, amber, etc.). Whether the first side or the second side is exposed to the environment may depend on the direction the vehicle (e.g., a bi-direction vehicle) is travelling, as described above (e.g., as may be received from a controller). Incoming light (e.g., sunlight, headlights, etc.) originating from external to housing 402 reflects back light of the first color or the second color, depending on which side of the reflector element is exposed to the environment (e.g., first side 420 that is depicted in FIG. 4B may reflect a white light). If a color filter is used, then reflected light assumes the color of the color filter. Incoming light is blocked from reaching the unexposed or opposite side of the reflector elements by virtue of a barrier disposed between the first side and the second side.

Figure 4C:
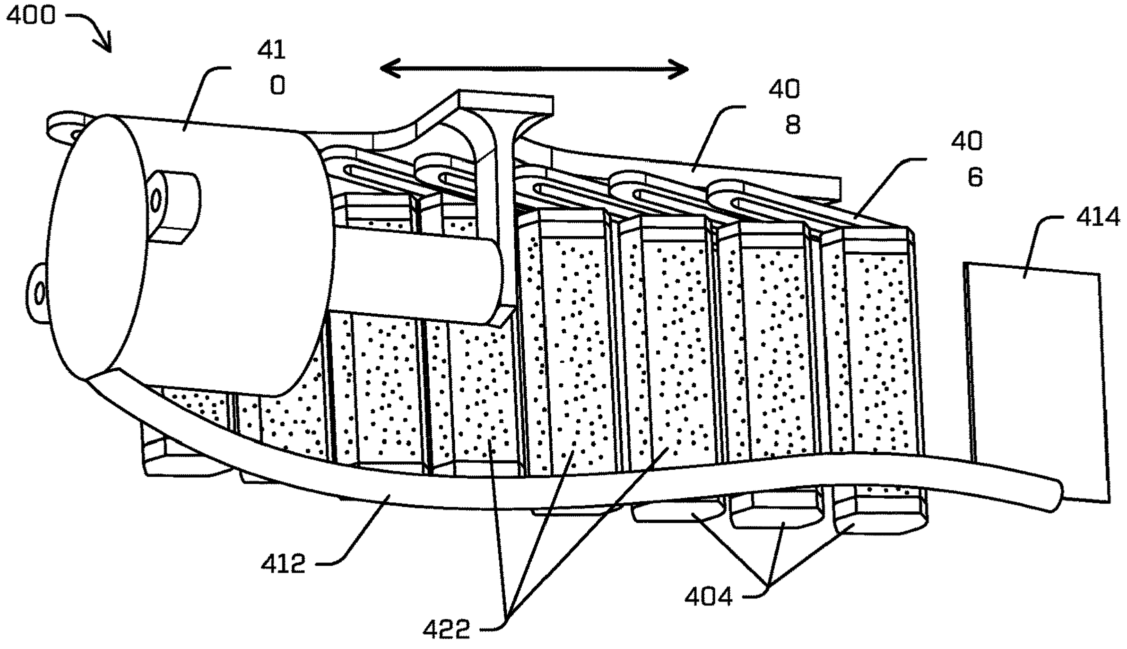
FIG. 4C depicts a back view of the example reflector unit of FIG. 4A.

FIG. 4C depicts a back view of reflector unit 400. The arrow indicates a direction that linkages 406 move when activated by actuator 410 and carrier 408. Actuator 410 may be used to initiate and/or control motion of the linkages 406 simultaneously via carrier 408. As shown in FIG. 4C, a second state or second side 422 of reflector elements 404 is a second color (or second pattern) different than the first color (or first pattern) of the first side 420.

Figure 5:
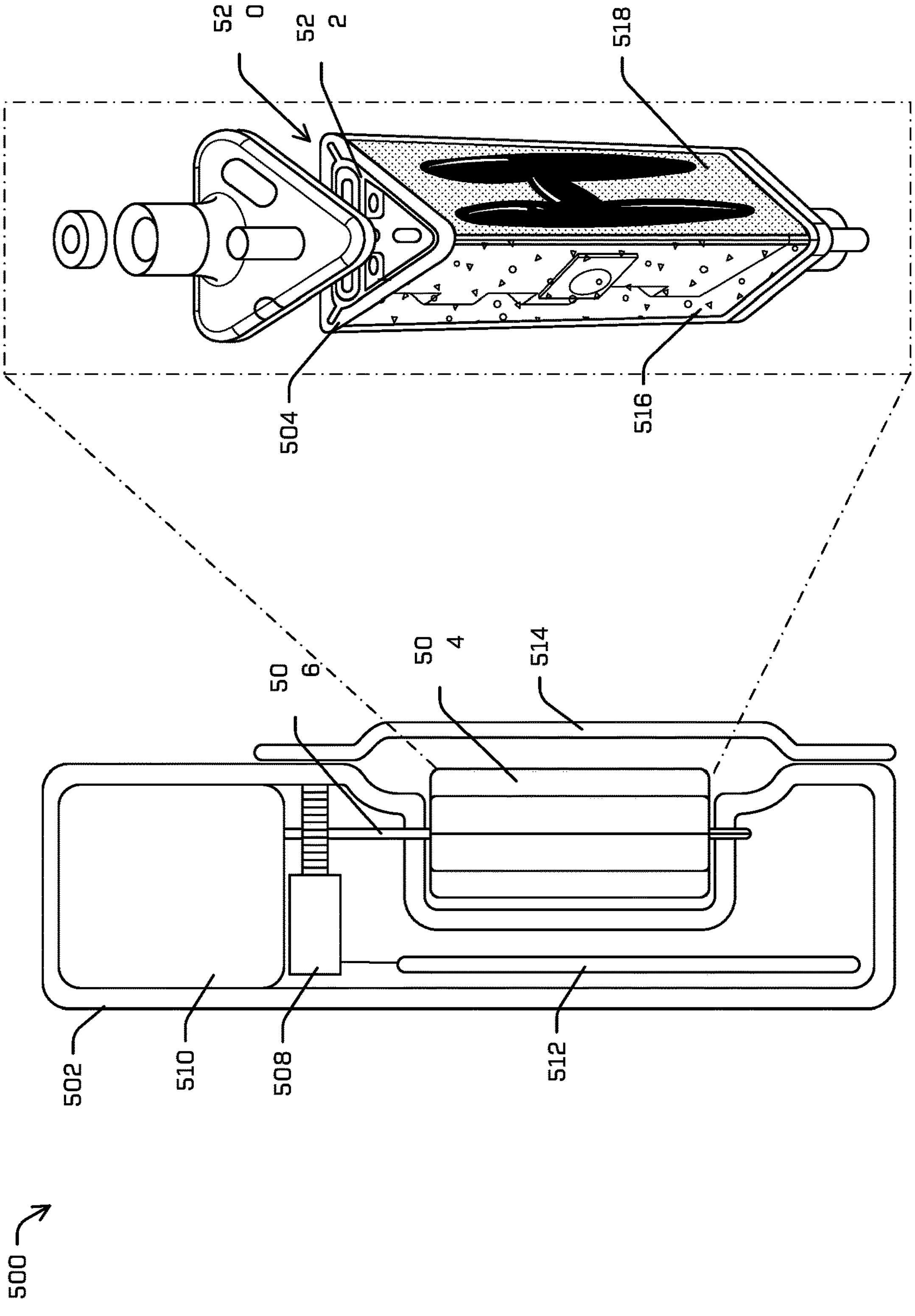
FIG. 5 depicts a schematic cross-sectional view of another example reflector unit. The excerpted view illustrates another example reflector element having three sides, where one of the sides includes a display.

FIG. 5 depicts a schematic cross-sectional view of another example reflector unit 500. The excerpted view illustrates another example reflector element 504 having three sides, where one of the sides (e.g., second side 518) includes a display. In some examples, reflector unit 500 may include a housing 502, reflector element 504, linkage 506, rack 508, actuator 510, controller 512, and/or lens 514.

Housing 502 may be composed of a same or similar material as housing 402 described in relation to FIG. 4A above. In examples, housing 502 may be settled or disposed on the interior side of a component of a vehicle (i.e., behind the fascia). Housing 502 may include a reflector element chamber having a depth that can accommodate the rotational sweep of the individual reflector elements as they rotate in parallel about an axis. The reflector element chamber may be covered by a transparent or translucent lens 514 or cover (e.g., similar to cover 204 as described above).

Reflector element 504 may be coupled to linkage 506. Linkage 506 may be a pinion, hydraulic piston, pin, link, arm, or the like configured to rotate about an axis. The linkage 506 may be pinned at one or both ends so that it fixedly rotates about an axis in response to movement of a track or rack 508. The rack 508 may be coupled to an actuator 510. Actuator 510 may be the same or similar to actuator 310 or 410 described above. Activation of actuator 510 causes rack 508 to move in a first direction or a second direction and the movement of rack 508 may cause linkage 506 and reflector element 504 to rotate about an axis. Reflector element 504 may rotate in a first direction or a second direction about the axis and transition from a first state to a second state or from a first state to a third state.

Actuator 510 may be configured to received signals from one or more controllers. Controller 512 may be a printed circuit board (PCB) or other electro-mechanical device used to receive input or control signals. Controller 512, which may be located within or external to housing 502, and may receive instructions (e.g., an electronic signal) from a planner component of the vehicle. The planner component may generate a trajectory controlling a motion of the autonomous vehicle based at least in part on sensor data. In an example where the vehicle is driver-controlled, the instructions may be received from a component that indicates a directionality of travel of the vehicle. The instructions may indicate a directionality of the vehicle, distinguishing one side of the vehicle as the front (or leading end) and an opposite side of the vehicle as the back (or trailing end), according to normal traffic laws. The controller may receive the instructions and may alter a state or position of components within the reflector unit based on the instructions. For example, where the instructions indicate a first driving configuration of the vehicle, the controller may transmit a signal or control a motor to actuate such that one or more reflector elements rotate (e.g., 180 degrees, 120 degrees, 90 degrees, etc.) and expose a different side of the one or more retroreflector element(s). In some examples, controller 512 may be used to control an operation speed or rate at which the reflector elements rotate and change from a first state to a second state.

In some examples, controller 512 may additionally or alternatively receive sensor data indicating a location of the vehicle and may determine, based at least in part on regulation data stored in a memory or retrieved via a network, regulations that may alter operations of the reflector unit. For example, while in a location associated with a jurisdiction identified in the regulation data as not requiring the retroreflectors, a controller may maintain the state or position of one or more retroreflector units.

Reflector element 504 may have three sides (e.g., first side 516, second side 518, and third side 520) where each of the three sides may be associated with the same or different function (e.g., reflect a different color, combination of colors, displays, etc.). In some examples, a barrier 522 may be disposed between the first side 516, second side 518, and third side 520 and prevent the photometric elements (or color) from peeking through the various sides and changing the color or image that is reflected into the environment. In some examples, at least one of the sides may be a passive retroreflector and at least one side may be an active display. An active display may present images or messages to pedestrians in the environment. In examples, a display may be any type of electronic device capable of displaying content, such as a liquid crystal display (LCD), light-emitting diode (LED) display, organic light-emitting diode (OLED), cathode ray tube (CRT), e-link display, or other device (e.g., multi-segment display, quantum dot display, electroluminescent display, etc.) configured to change an image of its display. In the case of an LCD, light may be emitted and/or reflected off of colored pixels of an LCD itself, thereby providing passive/reflected light in addition to or instead of emitted light, or the LCD may display images or messages.

In some examples, a display on one or more sides of the reflector elements may assist a passenger in identifying a ride share vehicle. To assist a passenger in identifying the arrival of a requested transportation, a vehicle may be configured to notify or otherwise alert the passenger to the presence of the vehicle as it approaches the passenger using a display on one or more sides of a reflector element. For example, a vehicle may send a signal to a controller of a reflector unit to activate a display on a side of one or more reflector element(s) in a reflector unit (e.g., a reflector unit positioned proximate a vehicle door) and present the passenger with information regarding the status of the vehicle. A certain message may be generated so that the passenger may readily perceive that vehicle is reserved to service the transportation needs of passenger. As an example, the vehicle may generate various patterns or messages on the display of a reflector unit that may be perceived by passenger. For example, the vehicle may display a passenger's initials, order number of the requested transportation, identification message, status of the vehicle (available or not available/reserved for transportation) and the like.

In some examples, where one or more sides of a reflector element is associated with an active display, the reflector element may be configured to rotate or transition from one state to another based on various environmental signals or changes in a state of the vehicle. For example, a reflector unit disposed on a vehicle may include one or more reflector elements that comprise one or more sides with an active display. The active display may be used to present a message or image (e.g., an advertisement, an alert or warning message, or other message related to an operation or operational intent of the vehicle) while the vehicle is traversing the environment. The reflector unit may be programmed to rotate the elements (individually or in unison) between states that may include a display based on a passage of time (e.g., every 10 seconds, 15 seconds, . . . N seconds etc.), based on distance traveled (50 meters, every mile, 5 miles, . . . N miles etc.), a particular location or map data, time of day, detecting an object in the environment (detecting a pedestrian, a cyclist, other vehicle, etc.) and the like. In examples, controller 512 may cause an element of the reflector unit to display an image or message across a plurality of elements such that a whole of the plurality of elements display a complete image or message. For example, second side 518 in FIG. 5 depicts the letter "H", which may represent a portion of the word "HELLO."

As discussed above, multiple reflector units (or reflector systems) may be located and disposed on different portions of the vehicle. In some examples, a first portion of the reflector units (e.g., retroreflector units disposed on a leading end and/or trailing end of a vehicle) may be controlled by a first controller and a second portion of the reflector units (e.g., retroreflector units disposed on the sides of the vehicle proximate passenger doors) may be controlled by another controller (e.g., a second controller). In some examples, a first portion of the reflector units may be configured to transition between two states (e.g., have two sides) and a second portion of reflector units disposed about a vehicle may be configured to transition between three or four states (e.g., three or four sides). That is, any combination of reflector units as described throughout this application may be used and disposed about a vehicle.

Figure 6:
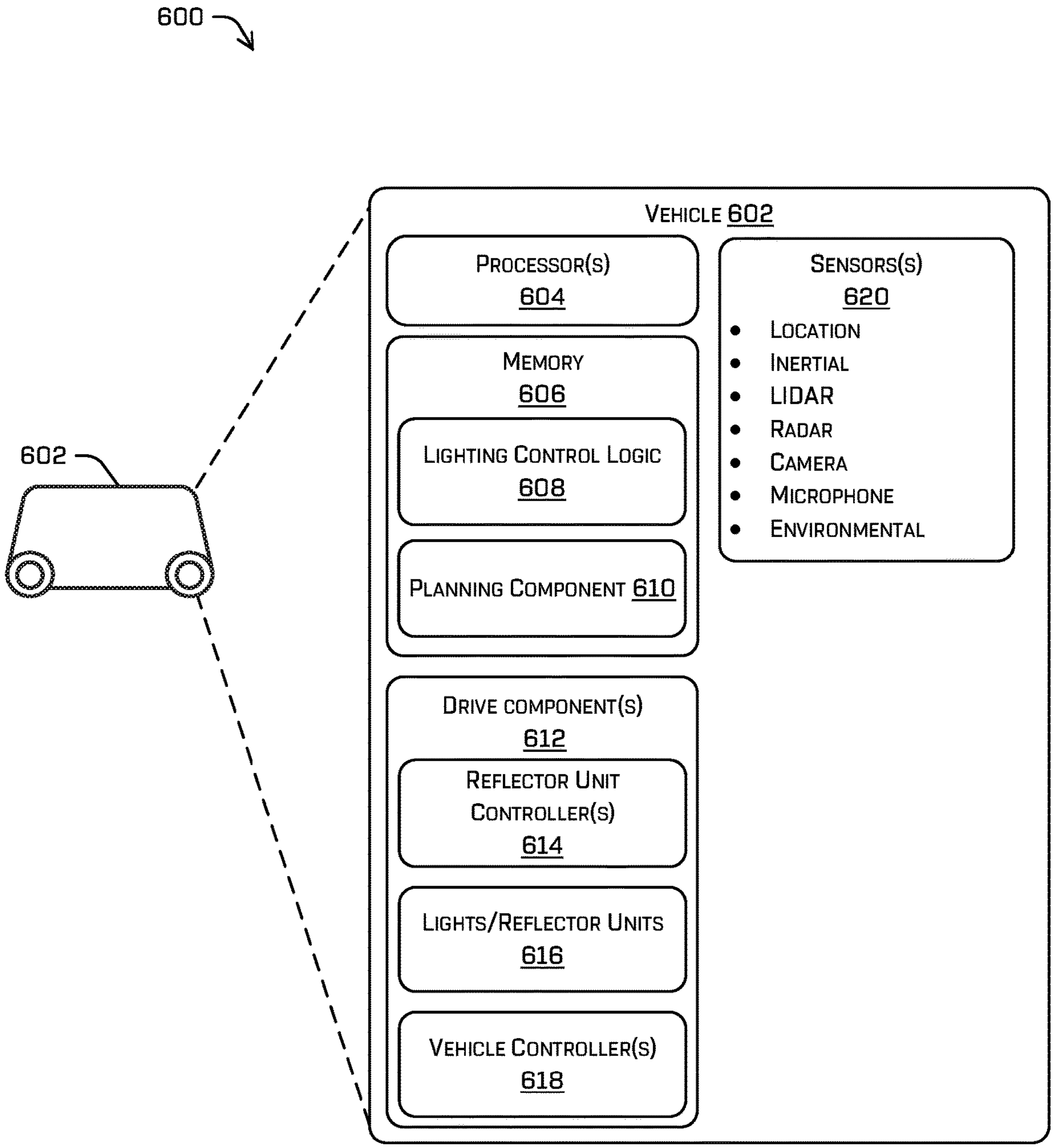
FIG. 6 depicts a block diagram of an example system for implementing various reflector units, as described herein.

FIG. 6 is a block diagram of a system 600, including a vehicle 602, for implementing various reflector units and active light systems, as described herein. System 600 may be configured to control operation of the vehicle, which may be an autonomous vehicle, and to control various lighting functions. In some examples, system 600 may include processor(s) 604 and/or memory 606. These elements are illustrated in combination in FIG. 6, although it is understood that they may be separate elements of system 600, and that components of the system may be implemented as hardware and/or software, in some examples.

Processor(s) 604 may include a uniprocessor system including one processor, or a multiprocessor system including several processors (e.g., two, four, eight, or another suitable number). Processor(s) 604 may be any suitable processor capable of executing instructions. For example, in various implementations, processor(s) 604 may be general-purpose or embedded processors implementing any of a variety of instruction set architectures (ISAs), such as the x86, PowerPC, SPARC, or MIPS ISAs, or any other suitable ISA. In multiprocessor systems, each processor 604 may commonly, but not necessarily, implement the same ISA. In some examples, the processor(s) 604 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

System 600 may include memory 606. In some examples, memory 606 may include a non-transitory computer readable media configured to store executable instructions/modules, data, and/or data items accessible by processor(s) 604. In various implementations, the non-transitory computer readable media may be implemented using any suitable memory technology, such as static random-access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to system 600. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface(s), for example.

Furthermore, though illustrated as a single unit in FIG. 6, it is understood that processor(s) 604 and memory 606 may be distributed among multiple computing devices of the vehicle and/or among multiple vehicles, data centers, teleoperation centers, etc. In some examples, processor(s) 604 and memory 606 may conduct at least some of the techniques discussed herein.

Memory 606 may include lighting control logic 608, which may include algorithms to control the rotation or illumination of various components/reflector elements of a reflector unit. For example, such algorithms may correspond to lighting profiles to be used on a display associated with a side of a reflector element or on different models of vehicles and/or on such vehicles in different countries (e.g., having varying regulations). Accordingly, the algorithms could be applied to a controller associated with a reflector unit as needed.

System 600 may include network interface(s) configured to establish a communication link (i.e., "network") between the system and one or more other devices. In various implementations, the network interface(s) may support communication via wireless general data networks, such as a Wi-Fi network, and/or telecommunications networks, such as, for example, cellular communication networks, satellite networks, and the like. In some examples, sensor data, such as a received signal, TDOA, depth measurement, output signal(s), return(s), and/or detection(s), etc., may be received at a first vehicle and transmitted to a second computing device. In some examples, at least some of the components of the LIDAR may be located at different devices. For example, a first vehicle may include the light emitter and light sensor and may generate the received signal but may transmit the received signal to a second vehicle and/or remote computing device.

Memory 606 may include a planning component 610 that can determine a path for vehicle 602 to follow to traverse through an environment. For example, planning component 610 can determine various routes and trajectories and various levels of detail. For example, planning component 610 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planning component 610 can generate an instruction for guiding the autonomous vehicle along at least a portion of the route from the first location to the second location. In at least one example, planning component 610 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 602 to navigate.

Planning component 610 may generate a direction signal that indicates the direction of vehicle travel. A reflector unit controller may receive the direction signal and control a position or state of various components associated with the reflector unit based on this signal. For example, if vehicle 602 is travelling so that a first end of the vehicle is leading the second end, then a reflector unit on the first end of the vehicle may function to behave as a white reflector and a reflector unit on the second end of the vehicle may function as a red reflector. On the other hand, if the vehicle is travelling so that the second end of the vehicle is leading the first end, then the reflector units may function oppositely, based on the direction signal from planning component 610.

System 600 may include one or more drive components 612. In some instances, the vehicle may have a single drive component. In some instances, drive component(s) 612 may include one or more sensors to detect conditions of drive component(s) 612 and/or the surroundings of the vehicle. Drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights and/or one or more illumination units and light units for signaling or illuminating an exterior surrounding of the vehicle), and one or more other systems (e.g., cooling system, safety systems, onboard charging system, other electrical components such as a DC/DC converter, a high voltage junction, a high voltage cable, charging system, charge port, etc.).

Drive component(s) 612 may include a reflector unit controller 614 and lights/reflector unit(s) 616. Reflector unit controller 614, which may comprise a portion of (or be the same as) controller 512 described above, may comprise one or more individual light controllers. Reflector unit controller 614 may be communicatively coupled to one or more other reflector unit controllers, which in turn may be communicatively coupled to a vehicle controller 618 that at least partially manages various operations of the vehicle. Lights/reflector unit(s) 616 may comprise one or more reflector unit controllers and light units. Lights/reflector unit(s) 616 may also comprise various other lighting, such as license plate lights, side marker lights, and so on. Lighting of vehicle 602 may be configured to operate in a fashion that allows for lighting redundancy on each end of the vehicle, as described above. Accordingly, in some implementations, control of lights and reflector units of vehicle 602 may be shared among two or more such reflector unit controllers. For example, some reflector units of the vehicle may be controlled by a first reflector unit controller while other reflector units of the vehicle may be controlled by a second reflector unit controller.

Additionally, drive component(s) 612 may include a vehicle controller 618 which may receive and preprocess data from the sensor(s) and to control operation of the various vehicle systems. In some instances, the vehicle controller 618 may include one or more processors and memory communicatively coupled with the one or more processors. The memory may store one or more components to perform various functionalities of drive component(s) 612. Furthermore, drive component(s) 612 may also include one or more communication connection(s) that enable communication by the respective drive component with one or more other local or remote computing device(s).

System 600 may include sensor(s) 620 configured to localize the vehicle 602 in an environment, to detect one or more objects in the environment, to sense movement of the vehicle through its environment, sense various optical characteristics (e.g., intensity and spectra) of incoming light, sense environmental data (e.g., ambient temperature, pressure, and humidity), and/or sense conditions of an interior of the vehicle (e.g., passenger count, interior temperature, noise level). Sensor(s) 620 may include, for example, one or more LIDAR sensors, one or more cameras (e.g. RGB-cameras, intensity (grey scale) cameras, infrared cameras, depth cameras, stereo cameras), one or more magnetometers, one or more radar sensors, one or more sonar sensors, one or more microphones, one or more inertial sensors (e.g., accelerometers, gyroscopes), one or more GPS sensors, one or more wheel encoders, one or more drive system sensors, a speed sensor, a photosensor(s) (e.g., 814) and/or other sensors related to the operation of the vehicle.

Figure 7:
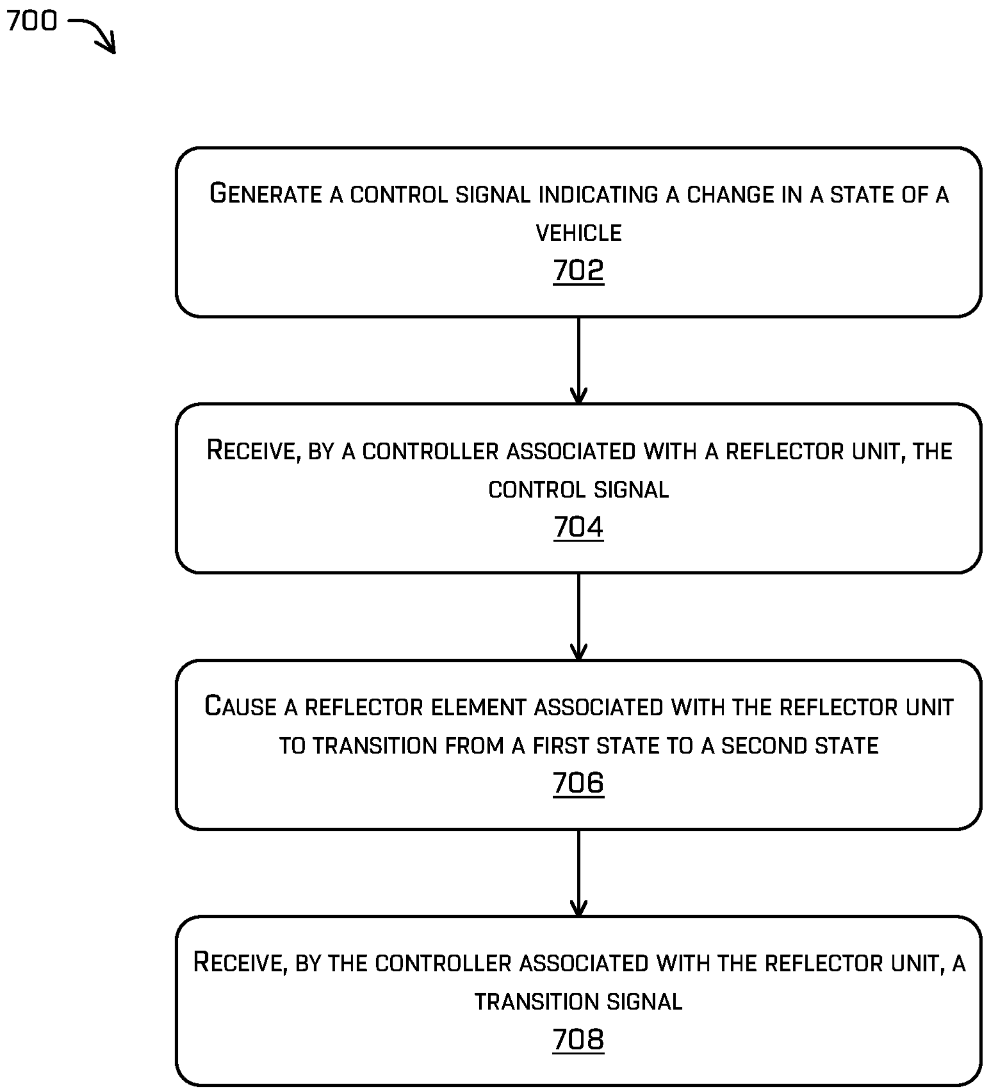
FIG. 7 illustrates a flow chart outlining an example process to transition a reflector element from a first state to a second state using the techniques described herein.

FIG. 7 illustrates a flow chart outlining an example process 700 to transition a rotatable reflector element(s) from a first state to a second state using the techniques described herein. Example process 700 may represent a sequence of operations that can be implemented in hardware, software, or a combination thereof. In the context of software, the operations represent computer-executable instructions stored on one or more computer readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

At operation 702, a system or component of a vehicle (e.g., planning component, drive component, sensor(s), etc.) may generate a control signal. In examples, the control signal may indicate a state or operation of the vehicle, a planned vehicle state or operation (the vehicle is about to change an orientation of travel), or a change in a travel orientation (i.e., which end of a bidirectional vehicle is a leading end and which end is a trailing end), detecting a fault with a vehicle system or component, etc. In some examples, the control signal may be a signal indicating the vehicle has arrived at a destination or is approaching a destination. In some examples, the control signal may be associated with a passage of time (e.g., 10 seconds, 15 seconds, . . . N seconds etc.), a distance (50 meters, 1 mile, 5 miles, . . . N miles etc.), a location or map data, time of day, or any other change in a state of the vehicle. In examples, a control signal may indicate which image or message to display on an active display associated with a reflector unit.

At operation 704, a controller associated with a retroreflector unit may receive the control signal. The controller may control a position or state of various components associated with the reflector unit(s) based on the received control signal. For example, if a vehicle is travelling so that a first end of the vehicle is leading the second end, then a reflector unit on the first end of the vehicle may function to behave as a white or amber reflector and a reflector unit on the second end of the vehicle may function as a red reflector. On the other hand, if the vehicle is travelling so that the second end of the vehicle is leading the first end, then the reflector unit may function oppositely, based on the control signal from the planning component. In some examples, the controller may be configured to receive signals from a source external to the vehicle, such as from an autonomous vehicle service platform, remote computing device (e.g., teleoperator computing device), etc. In some examples, different reflector units or systems may be configured to communicate or receive signals from different systems or components associated with the vehicle.

At operation 706, an actuator associated with the reflector unit may cause a retroreflector element(s) to transition from a first state to a second state. An actuator (e.g., a servomotor, electric motor, brushed or brushless motor, stepper motor, hydraulic actuator, electro-hydraulic system, linear actuator, pneumatic actuator, etc.) may be coupled to the plurality of reflector elements via one or more linkages (e.g., rack, gear, pinion, hydraulic piston, pin, link, arm, etc.). In at least one example, individual (or multiple) actuators may be coupled to individual reflector elements. The actuator, when activated, may be configured to cause the plurality of reflector elements to transition from the first state to the second state. For example, a first state of the reflector element may be associated with a first side that is configured to reflect light of a first color or first light patten and the second state of the reflector element may be associated with a second side (or unexposed side) that is configured to reflect light of a second color or second light pattern.

At operation 708, the controller associated with the reflector unit may receive a transition signal from the reflector unit. In some examples, the transition signal may represent a confirmation signal indicating the reflector element has transitioned from the first state to the second state. In some examples, the transition signal may include a time at which the reflector element of the reflector unit has started a transition process and/or a time at which the reflector element has completed the transition process. The transition signal may be stored in a memory associated with the vehicle and/or in some other memory, such as a remote memory associated with a remote computing device.

EXAMPLE CLAUSES

Any of the example clauses in this section may be used with any other example clauses and/or any of the other examples described herein.

A. A bi-directional vehicle comprising: a fascia disposed at a first end of the bi-directional vehicle; and a reflector unit coupled to the fascia, the reflector unit comprising: reflector elements comprising a first side and a second side, the first side configured to reflect light of a first color and the second side configured to reflect light of a second color different than the first color; linkages coupled to the reflector elements; an actuator mechanically coupled to the linkages; and a controller configured to: receive a signal indicating a change in travel orientation of the bi-directional vehicle; and in response to receiving the signal, cause the actuator to apply force to the linkages and cause the reflector elements to transition from the first side to the second side.

B. The bi-directional vehicle of paragraph A, wherein the linkages comprise pinions coupled to a rack.

C. The bi-directional vehicle of paragraph B, wherein the rack associated with the linkages has a curved profile such that the reflector elements are disposed off-plane relative to each other.

D. The bi-directional vehicle of any of paragraphs A-C, wherein the reflector unit is a first reflector unit, the bi-directional vehicle further comprising: a second reflector unit coupled to a lateral side of the bi-directional vehicle, the second reflector unit comprising: a second set of reflector elements having a first state and a second state, the first state configured to reflect light of a first color and the second state configured to reflect light of a third color different than the second color; and a second actuator coupled to the second set of reflector elements, wherein the controller or another controller is configured to, upon activation, cause the second set of reflector elements to transition from the first state to the second state.

E. A reflector system configured to operate on a vehicle, the reflector system comprising: elements comprising at least a first side and a second side, the first side configured to reflect light of a first color and the second side being different than the first side; an actuator coupled to the elements; and a controller configured to: receive a signal indicating a change in a state of the vehicle; and in response to receiving the signal, cause the actuator to transition the elements from a first position in which the first side is facing an exterior of the vehicle to a second position in which the second side is facing the exterior of the vehicle.

F. The reflector system of paragraph E, wherein the second side is configured to reflect light of a second color different than the first color.

G. The reflector system of paragraphs E or F, wherein the actuator is mechanically coupled to one or more linkages, the one or more linkages comprising pinions coupled to a rack.

H. The reflector system of any of paragraphs E-G, wherein the elements are disposed off-plane relative to each other.

I. The reflector system of any of paragraphs E-H, wherein the change in the state of the vehicle is a change in a direction of travel.

J. The reflector system of any of paragraphs E-I, wherein the actuator is mechanically coupled to the elements via one or more linkages, the one or more linkages comprising: a plurality of pivot arms configured to pivot 180 degrees; and a carrier coupled to the actuator and configured to, upon activation, transfer a force generated by the actuator onto the plurality of pivot arms.

K. The reflector system of any of paragraphs E-J, wherein the elements are disposed in a housing.

L. The reflector system of clause any of paragraphs E-K, the reflector system further comprising: a marker light disposed in or on the housing proximate the elements.

M. The reflector system of any of paragraphs E-L, wherein at least one of the elements further comprise a third side, the third side being different than the first side and the second side.

N. The reflector system of any of paragraphs E-M, wherein a surface area of the first side is between about 10 cm2 and about 40 cm2.

O. A reflector unit comprising: reflector elements, wherein individual reflector elements comprise a first side and a second side, the first side associated with a first state and configured to reflect light of a first color and the second side associated with a second state different than the first state; and an actuator coupled to the reflector elements, the actuator configured to cause the reflector elements to transition from the first state to the second state.

P. The reflector unit of paragraph O, wherein the reflector elements comprise a third side associated with a third state.

Q. The reflector unit of paragraphs O or P, wherein the third state presents an active display configured to output an image or a message.

R. The reflector unit of any of paragraphs O-Q, wherein the actuator is configured to cause the reflector elements to transition from the first state to the second state, and from the second state to the first state based on a period of time.

S. The reflector unit of any of paragraphs O-R, wherein the first state is associated with a first color filter and the second state is associated with a second color filter different than the first color filter.

T. The reflector unit of any of paragraphs O-S, wherein the actuator is coupled to the reflector elements via one or more linkages, the one or more linkages comprising a plurality of pinions coupled to a rack.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be understood that other examples can be used and that changes or alterations, such as structural changes, can be made. Such examples, changes or alterations are not necessarily departures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A bi-directional vehicle comprising:

a fascia disposed at a first end of the bi-directional vehicle; and a reflector unit coupled to the fascia, the reflector unit comprising:

reflector elements comprising a first side and a second side, the first side configured to reflect light of a first color and the second side configured to reflect light of a second color different than the first color;

linkages coupled to the reflector elements;

an actuator mechanically coupled to the linkages; and a controller configured to:

receive a signal indicating a change in travel orientation of the bi-directional vehicle from a first orientation to a second orientation that is opposite to the first orientation; and in response to receiving the signal, cause the actuator to apply force to the linkages and cause the reflector elements to transition from the first side to the second side, to indicate a front end of the bi-directional vehicle to become a rear end of the bi-directional vehicle.

2. The bi-directional vehicle of claim 1, wherein the linkages comprise pinions coupled to a rack.

3. The bi-directional vehicle of claim 2, wherein the rack associated with the linkages has a curved profile such that the reflector elements are disposed off-plane relative to each other.

4. The bi-directional vehicle of claim 1, wherein the reflector unit is a first reflector unit, the bi-directional vehicle further comprising:

a second reflector unit coupled to a lateral side of the bi-directional vehicle, the second reflector unit comprising:

a second set of reflector elements having a first state and a second state, the first state configured to reflect light of a first color and the second state configured to reflect light of a third color different than the second color; and a second actuator coupled to the second set of reflector elements, wherein the controller or another controller is configured to, upon activation, cause the second set of reflector elements to transition from the first state to the second state.

5. A reflector system configured to operate on a bi-directional vehicle, the reflector system comprising:

elements comprising at least a first side and a second side, the first side configured to reflect light of a first color and the second side being different than the first side;

an actuator coupled to the elements; and a controller configured to:

receive a signal indicating a change in a travel direction of the bi-directional vehicle from a first direction to a second direction that is opposite to the first direction; and in response to receiving the signal, cause the actuator to transition the elements from a first position in which the first side is facing an exterior of the bi-directional vehicle to a second position in which the second side is facing the exterior of the bi-directional vehicle, to indicate a front end of the bi-directional vehicle to become a rear end of the bi-directional vehicle, wherein the first side is configured to face a leading end of the bi-directional vehicle and the second side is configured to face a trailing end of the bi-directional vehicle.

6. The reflector system of claim 5, wherein the second side is configured to reflect light of a second color different than the first color.

7. The reflector system of claim 5, wherein the actuator is mechanically coupled to one or more linkages, the one or more linkages comprising pinions coupled to a rack.

8. The reflector system of claim 5, wherein the elements are disposed off-plane relative to each other.

9. The reflector system of claim 5, wherein the actuator is mechanically coupled to the elements via one or more linkages, the one or more linkages comprising:

a plurality of pivot arms configured to pivot 180 degrees; and a carrier coupled to the actuator and configured to, upon activation, transfer a force generated by the actuator onto the plurality of pivot arms.

10. The reflector system of claim 5, wherein the elements are disposed in a housing.

11. The reflector system of claim 10, the reflector system further comprising:

a marker light disposed in or on the housing proximate to the elements.

12. The reflector system of claim 5, wherein at least one of the elements further comprises a third side, the third side being different than the first side and the second side.

13. The reflector system of claim 5, wherein a surface area of the first side is between about 10 $cm^2$ and about 40 $cm^2$.

14. A reflector unit comprising:

reflector elements, wherein individual reflector elements comprise a first side and a second side, the first side associated with a first state and configured to reflect light of a first color and the second side associated with a second state different than the first state; and an actuator coupled to the reflector elements, the actuator configured to cause the reflector elements to transition from the first state to the second state to indicate a front end of a bi-directional vehicle including the reflector unit to become a rear end of the bi-directional vehicle, in response to a change in a travel direction of the bi-directional vehicle from a first direction to a second direction that is opposite to the first direction, wherein the bi-directional vehicle is an autonomous vehicle, and is configured to operate symmetrically and have either end of the bi-directional vehicle to be a leading end or a trailing end depending on a configuration of the bi-directional vehicle.

15. The reflector unit of claim 14, wherein the reflector elements comprise a third side associated with a third state.

16. The reflector unit of claim 15, wherein the third state presents an active display configured to output an image or a message.

17. The reflector unit of claim 14, wherein the actuator is configured to cause the reflector elements to transition from the first state to the second state, and from the second state to the first state based on a period of time.

18. The reflector unit of claim 14, wherein the first state is associated with a first color filter and the second state is associated with a second color filter different than the first color filter.

19. The reflector unit of claim 14, wherein the actuator is coupled to the reflector elements via one or more linkages, the one or more linkages comprising a plurality of pinions coupled to a rack.

20. The reflector unit of claim 14, further comprising: a side marker light configured to actively emit light into an environment.

* * * * *